(12) United States Patent
Ma et al.

(10) Patent No.: US 8,509,558 B2
(45) Date of Patent: Aug. 13, 2013

(54) PROCESSING MULTI-VIEW DIGITAL IMAGES

(75) Inventors: Zhonghua Ma, North Epping (AU); Axel Lakus-Becker, Artarmon (AU); Ka-Ming Leung, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 12/762,617

(22) Filed: Apr. 19, 2010

(65) Prior Publication Data

US 2010/0271511 A1 Oct. 28, 2010

(30) Foreign Application Priority Data

Apr. 24, 2009 (AU) ................................. 2009201637

(51) Int. Cl.
*G06K 9/40* (2006.01)
*G06K 9/32* (2006.01)
*H04N 5/262* (2006.01)

(52) U.S. Cl.
USPC ............................ 382/254; 382/299; 348/239

(58) Field of Classification Search
USPC ................. 382/299, 254, 154, 286; 348/239, 348/135–149
See application file for complete search history.

(56) References Cited

U.S. PATENT DOCUMENTS

| 6,738,073 | B2 | 5/2004 | Park et al. | |
|---|---|---|---|---|
| 7,561,731 | B2 * | 7/2009 | Wallace et al. | 382/154 |
| 7,660,438 | B2 * | 2/2010 | Camus | 382/104 |
| 2003/0190072 | A1 | 10/2003 | Adkins et al. | |
| 2006/0158522 | A1 | 7/2006 | Pryor | |
| 2008/0043096 | A1 | 2/2008 | Vetro et al. | |
| 2008/0310513 | A1 | 12/2008 | Ma et al. | |
| 2009/0116554 | A1 | 5/2009 | Ma et al. | |
| 2010/0111198 | A1 | 5/2010 | Lackus-Becker et al. | |

OTHER PUBLICATIONS

Mourad Ouaret et al., "Fusion-based Multiview Distributed Video Coding", Proceedings of the 4th ACM International Workshop of Video Surveillance and Sensor Networks, 2006 (CITX523390).
Chuohao Yeo et al., "Robust distributed multi-view compression for wireless camera networks," Proceedings of SPIE: Visual Communications and Image Processing, Jan. 2007, (CITX523388).
Christine Guillemot et al., "Distributed Monoview and Multiview Video Coding," IEEE Signal Processing Magazine, Sep. 2007, pp. 67-76 (CITX523389).

* cited by examiner

*Primary Examiner* — Yon Couso
(74) *Attorney, Agent, or Firm* — Fitzpatrick, Cella, Harper & Scinto

(57) ABSTRACT

Methods, apparatuses (100, 400, 1000), and computer program products for generating an enhanced digital image (490, 495, 1022) comprising a plurality of pixels are disclosed. Using a first digital image (420, 1020) captured from a first camera (124) and parity bits (410, 415, 1010) generated from a second digital image captured by a second camera (122, 126), a third digital image (445, 447, 1045) is constructed. The second camera (122, 126) captures the second image at a resolution different to the resolution of the first camera (124) capturing the first image (420, 1020). A disparity map (455, 457, 1055) between the first image (420, 1020) and the third image (445, 447, 1045) is determined (450, 452, 1050). One of the first image (420, 1020) and the third image (445, 447, 1045) is enhanced (470, 472, 1070) dependent upon the determined disparity map (455, 457, 1055) to generate the enhanced digital image (490, 495, 1022).

20 Claims, 11 Drawing Sheets

PROCESSING MULTI-VIEW DIGITAL IMAGES

RELATED APPLICATION

The present application claims under 35 USC 119 the benefit of the earlier filing date of Australian Patent Application No. 2009201637 filed on 24 Apr. 2009, of which the entire contents are hereby incorporated by reference.

TECHNICAL FIELD

The present invention relates generally to video encoding and decoding and, in particular, to processing multi-view digital images.

BACKGROUND

Digital still cameras and digital video cameras are popular optical devices used for capturing static images and videos. These devices contain an image sensing device, such as a charge coupled device (CCD), which is used to capture light energy focussed on the image sensing device that is indicative of a scene. The captured light energy is processed to form a digital image. Various formats are used to represent such digital images, or videos. Formats used to represent video include JPEG, JPEG2000, Motion JPEG, Motion JPEG2000, MPEG1, MPEG2, MPEG4 and H.264.

All the formats listed above have in common that the formats are compression formats. While these formats offer high quality and improve the number of images that can be stored on a given media, the formats typically suffer from long encoding runtime. For a conventional format, such as JPEG, JPEG2000, Motion JPEG, Motion JPEG2000, MPEG1, MPEG2, MPEG4 and H.264, the encoding process is typically five to ten times more complex than the decoding process.

Multi-view images (and videos) typically refer to a set of overlapped images capturing a scene from different view positions. One or more cameras can be employed to take multi-view images. One common approach in compressing multi-view images is to encode the images (and videos) from different viewpoints independently using the aforementioned compression schemes. However, this approach does not exploit the correlation between different views and often results in an enormous amount of redundant data to be transmitted or stored in a storage device. An alternative approach is to exploit the disparity correlation between different views at the encoder. This is equivalent to performing motion estimation at the encoder in conventional video coding. With this encoding approach, a joint encoder reads the captured images from all different viewpoints and performs inter-view predictive coding on the captured images. This coding scheme can achieve high coding efficiency at the expense of a high computational complexity encoder.

Wyner-Ziv coding, or "distributed video coding", has recently been extended to stereo and multi-view imaging to address the shortcomings of conventional approaches. In a distributed video coding (DVC) scheme, the complexity is shifted from the encoder to the decoder. Typically, the set of input images taken at different viewpoints is usually split into two subsets. The first subset of images is compressed using a conventional coding scheme, such as JPEG, JPEG2000, Motion JPEG, Motion JPEG2000, MPEG1, MPEG2, MPEG4 and H.264, and the decoder conventionally decodes the images. On the other hand, the second subset of images is encoded by channel coding methods and is predicted at the decoder from the conventionally encoded images. Such prediction processing is equivalent to carrying out inter-view disparity estimation, which is typically performed at a multi-view image encoder in conventional schemes. Then, the visual quality of the predicted images is further improved using parity information provided by the encoders.

One multi-view system using the distributed source coding paradigm has been developed based on an earlier DVC system using only one camera. This system first decodes all the views by performing a block-wise motion search in the temporal dimension. For each block that was not successfully decoded, the decoder then performs a disparity search on the available reconstruction using epipolar geometry correspondences.

Another technique suggests using disparity vector fields estimated on previously decoded frames to decode the current Wyner-Ziv frame. The system comprises a conventional camera to provide a view of a scene for disparity estimation and to be used for side information for Wyner-Ziv decoding. Alternatively, the system decodes all the views independently using temporal side information. If temporal side information estimation fails, a disparity search is then performed on the available reconstruction.

These foregoing techniques and systems assume all images are captured at a fixed resolution and may perform sub-optimally when this condition is violated.

SUMMARY

In accordance with an aspect of the invention, there is provided a method of generating an enhanced digital image comprising a plurality of pixels. Using a first digital image captured from a first camera and parity bits generated from a second digital image captured by a second camera, a third digital image is constructed. The second camera captures the second image at a resolution different to the resolution of the first camera capturing the first image. A disparity map dependent upon the first image and the third image is determined. One of the first image and the third image is enhanced dependent upon the determined disparity map to generate the enhanced digital image.

The method may further comprise the steps of: obtaining the first image from the first camera; and obtaining the parity bits generated from the second image captured by the second camera.

The first image may be captured at a higher resolution than the second image.

The first and second images may be captured by the first and second cameras, respectively, having overlapping views of a scene.

The method may further comprise the step of downsampling the first digital image to a resolution matching the resolution of the second digital image. The method may still further comprise the step of Wyner-Ziv decoding the parity bits generated from the second digital image using the downsampled first image to provide the third image, the parity bits output by a Wyner-Ziv encoder coupled to the second camera.

The disparity map may be determined using a downsampled version of the first image to provide a disparity map between the downsampled version of the first image and the third image.

The method may further comprise the step of interpolating the disparity map to provide a higher-resolution version of the disparity map for use in the enhancing step. Still further, the enhancing step may comprise disparity compensating the first image using the interpolated disparity map to generate the enhanced digital image, the enhanced digital image being a high resolution version of the second image. The disparity compensating may comprise, for each pixel location in the third image: extracting a corresponding disparity value from the interpolated disparity map; locating a reference pixel in the first image; and replacing a pixel value of the pixel location in the third image with the pixel value of the located reference pixel.

The method may further comprise the step of partitioning the first image into a plurality of image segments dependent upon the disparity map and the third image, each segment comprising an object having properties. The properties of the objects in the segments are used to enhance the first image in the enhancing step. The method may still further comprise the step of identifying the objects based on properties of the objects from a database of pre-defined object primitives, the predefined object primitives used in the enhancing step to enhance the first image.

The method may further comprise the steps of: using the first digital image captured from the first camera and parity bits generated from a fourth digital image captured by a third camera, constructing a fifth digital image, the third camera capturing the fourth image at a resolution different to the resolution of the first camera capturing the first image; determining a disparity map dependent upon the first image and the fifth image; and enhancing one of the first image and the fifth image dependent upon the determined disparity map to generate the enhanced digital image.

The first, third, and enhanced images may be stored in memory coupled to a processing unit, or may be stored in a computer readable medium.

In accordance with another aspect of the invention, there is provided an apparatus for generating an enhanced digital image comprising a plurality of pixels. The apparatus comprises: a memory for storing data and a computer program for a processor; and a processor coupled to the memory for executing the computer program stored in the memory to provide the enhanced digital image. The computer program comprises:

a computer program code module for, using a first digital image captured from a first camera and parity bits generated from a second digital image captured by a second camera, constructing a third digital image, the second camera capturing the second image at a resolution different to the resolution of the first camera capturing the first image;

a computer program code module for determining a disparity map dependent upon the first image and the third image; and a computer program code module for enhancing one of the first image and the third image is enhanced dependent upon the determined disparity map to generate the enhanced digital image.

The computer program may comprise other computer program code modules for effecting the steps of the foregoing method.

The apparatus may further comprise: a first camera for capturing the first image; a second camera for capturing the second image; an encoder coupled to the second camera for generating the parity bits from the second image; and a communication interface coupled to the memory and the processor for providing the first image and the parity bits from the second image to the memory and the processor.

In accordance with another aspect of the invention, there is provided an image processing apparatus for generating an enhanced digital image comprising a plurality of pixels. The apparatus comprises: a constructing unit configured to construct using a first image captured from a first camera and parity bits generated from a second camera a third image, the second camera capturing the second image at a resolution different to the resolution of the first camera capturing the first image; a determining unit configured to determining a disparity map dependent upon the first image and the third image; and an enhancing unit configured to enhance one of the first image and the third image dependent upon the determined disparity map to generate the enhanced digital image.

In accordance with another aspect of the invention, there is provided a computer program product comprising a computer readable medium having recorded thereon a computer program for providing an enhanced digital image comprising a plurality of pixels. The computer program comprises:

a computer program code module for, using a first digital image captured from a first camera and parity bits generated from a second digital image captured by a second camera, constructing a third digital image, the second camera capturing the second image at a resolution different to the resolution of the first camera capturing the first image;

a computer program code module for determining a disparity map dependent upon the first image and the third image; and a computer program code module for enhancing one of the first image and the third image is enhanced dependent upon the determined disparity map to generate the enhanced digital image.

The computer program may comprise other computer program code modules for effecting the steps of the foregoing method.

These and other aspects of the invention are described in greater detail hereinafter.

BRIEF DESCRIPTION OF THE DRAWINGS

Embodiments of the present invention are described hereinafter with reference to the drawings, in which.

DETAILED DESCRIPTION

Figure 1:
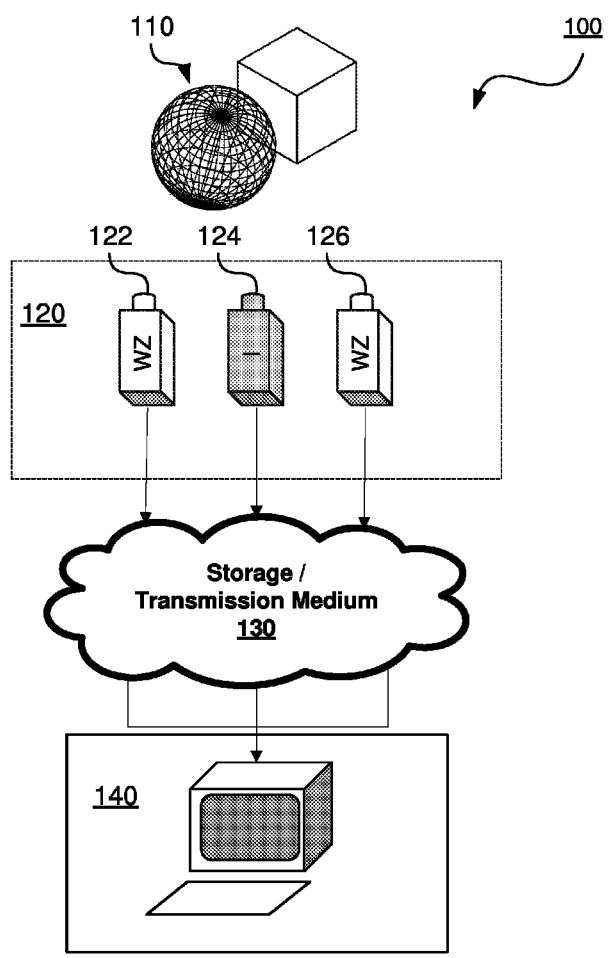
FIG. 1 is a block diagram of an exemplary configuration of a distributed multi-view video coding system, with which embodiments of the invention may be practiced.

Methods, apparatuses, and computer program products are disclosed for generating an enhanced digital image comprising a plurality of pixels. This involves processing multi-view digital images, each comprising a plurality of pixels. In the following description, numerous specific details, including image/video compression/encoding formats, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Multi-View Video Coding System

FIG. 1 shows a configuration of a distributed multi-view video coding system 100, comprising three independent video cameras 122, 124, and 126 for capturing images from different viewpoints of a scene 110. The scene 110 comprises a 3D spherical object and a 3D square object, for purposes of illustration only. The camera 124 is a conventional video camera generating raw pixel data or entropy encoded data, where "I" stands for Intra frame. In this embodiment, the other two cameras 122 and 126 each use a system 200 shown in FIG. 2A to perform Wyner-Ziv (WZ) encoding, which generates parity bits at lower image resolutions using bitwise error correction methods. These cameras 122, 124 and 126 are independent encoders and together form a distributed multi-view encoder 120.

Preferably, as shown in FIG. 1, the conventional video camera 124 is positioned horizontally half-way between the other two video cameras 122 and 126. This arrangement simplifies the computation of the disparity function between a Wyner-Ziv video camera (122 or 126) and the conventional video camera 124. However, other configurations are possible. For example, the camera 126 can be positioned further away from the conventional video camera 124 than the camera 122, or both cameras 122 and 126 can be positioned on the same side of the conventional camera 124. While three cameras are depicted in the embodiment of FIG. 1, the encoder 120 may comprise a conventional camera 124 and only one Wyner-Ziv camera 122 or 126.

Data transmission is performed independently from each video camera 122, 124, 126 to a distributed multi-view video decoder 140 via a transmission medium or a storage device 130.

Figure 4:
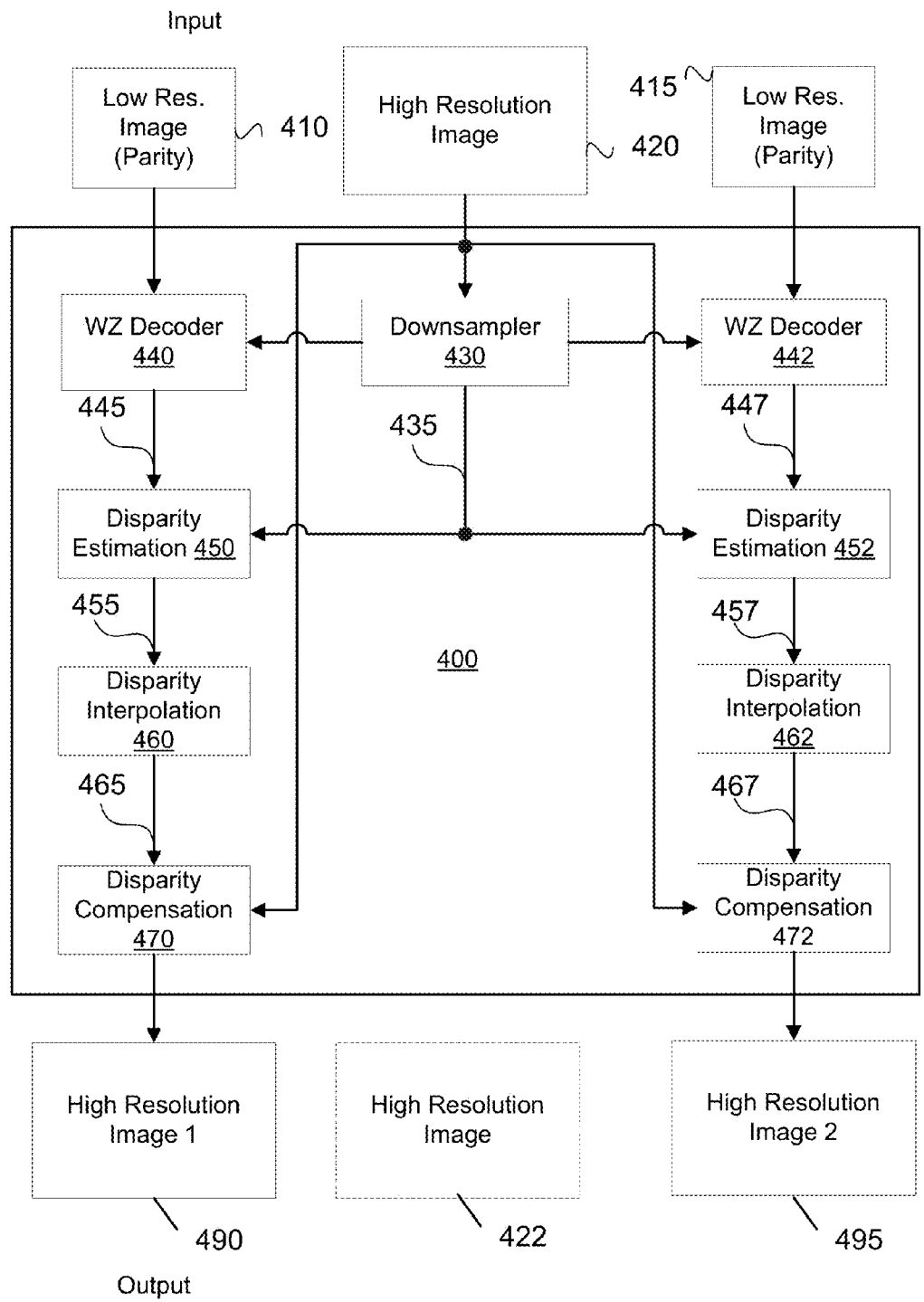
FIG. 4 is a schematic block diagram of a distributed multi-view video decoder in FIG. 1.

In a DVC scheme, decoding is performed jointly at the distributed multi-view video decoder 140 of FIG. 1, using the decoder system 400 shown in FIG. 4. The decoder 140 of FIG. 1 relies on a high resolution input image 420 from the conventional video camera 124 as side information and reconstructs images captured by the Wyner-Ziv video cameras 122 and 126 using parity bits. Together with these reconstructed images 490 and 495, the decoder 400 can further compute reliable information in relation to the properties of the 3D objects (such as position, width, height, and depth) in the scene and the locations of the light sources. The images 490, 422, and 495 may be stored in memory coupled to a processing unit, or may be stored in a computer readable medium. This information can therefore be used to enhance the quality of the high resolution input image 420 from the conventional camera 124 (e.g., removing block artefacts, sharpening edges, and adjusting intensity values of the over-exposed or under-exposed image areas).

Figure 2A:
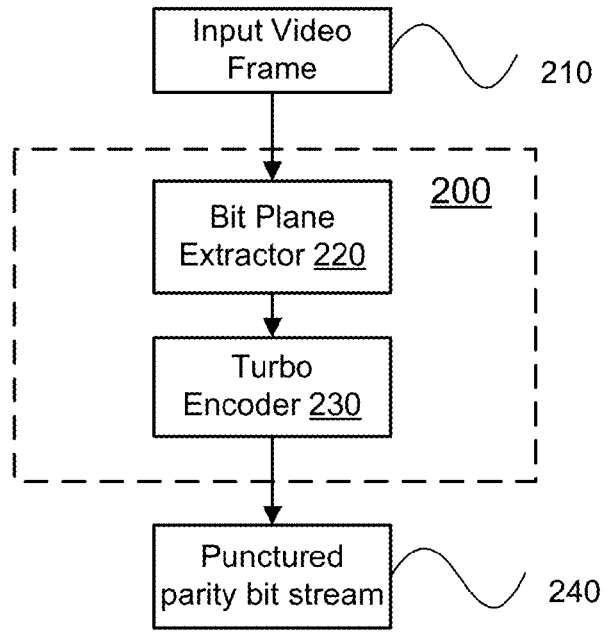
FIG. 2A is a schematic block diagram of a pixel-domain Wyner-Ziv encoder.
Figure 2B:
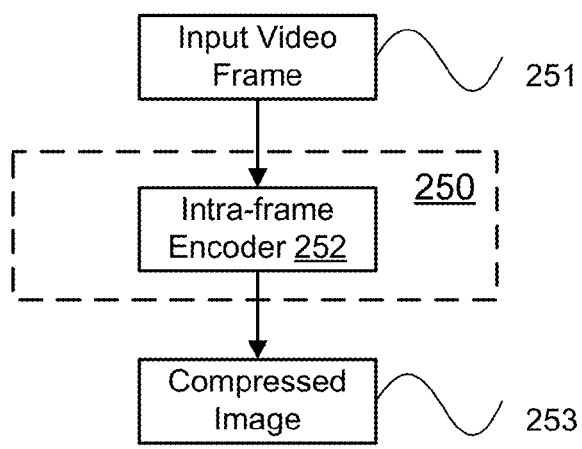
FIG. 2B is a schematic block diagram of a conventional video encoder.

The multiple independent video cameras 120 capture images of a 3D scene 110 from several viewpoints. The conventional camera 124 captures images at a given resolution $R_1$. The raw pixel values of such images may be transmitted directly to the distributed multi-view video decoder 140, or temporarily stored in the storage medium 130 for later transmission. Alternatively, the conventional camera 124 may compress the captured images using a conventional compression method prior to data transmission using the system 250 as shown in FIG. 2B, described hereinafter. The other video cameras in the encoder 120, e.g., cameras 122 and 126 in this example, perform Wyner-Ziv (WZ) encoding and generate parity bits using the system 200 as shown in FIG. 2A. The cameras 122, 126 of FIG. 1 capture the scene from different viewpoints at lower resolutions $R_2$ (than $R_1$).

Computer Implementation

The systems 200, 250, and 400 shown in FIGS. 2A, 2B, and 4 respectively, may be implemented using a computer system 900, such as that shown in FIG. 9, where the encoder 200, the encoder 250, and the decoder 400 may be implemented as software, such as one or more application programs executable within the computer system 900. The software may be stored in a computer readable medium, including the storage devices described hereinafter, for example. The software is loaded into the computer system 900 from the computer readable medium, and then executed by the computer system 900. A computer readable medium having such software or computer program recorded on the medium is a computer program product.

Figure 9A:
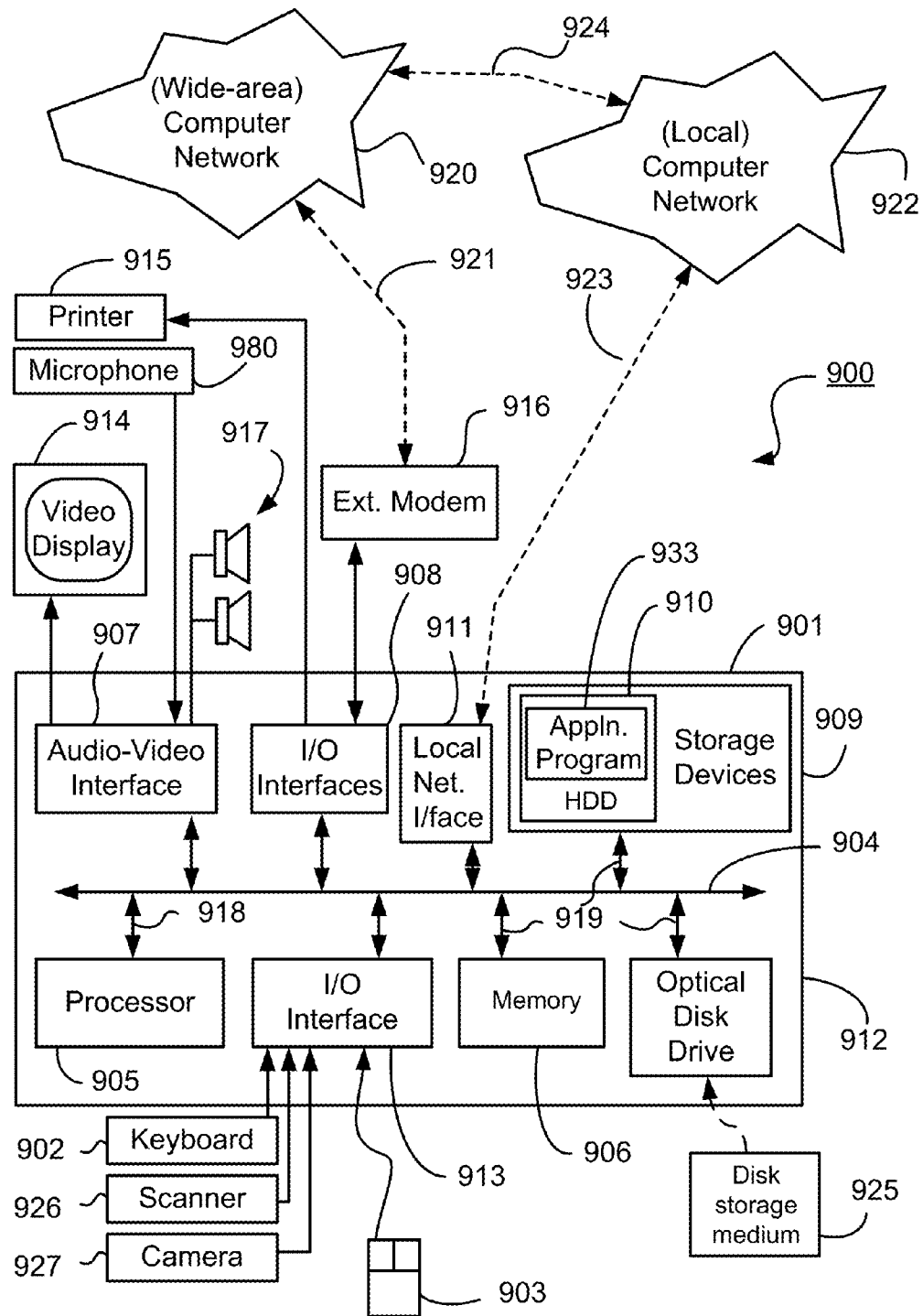
FIG. 9 is a schematic block diagram of a computer system in which the system components shown in FIGS. 2A, 2B, and 4 may be implemented.
Figure 9B:
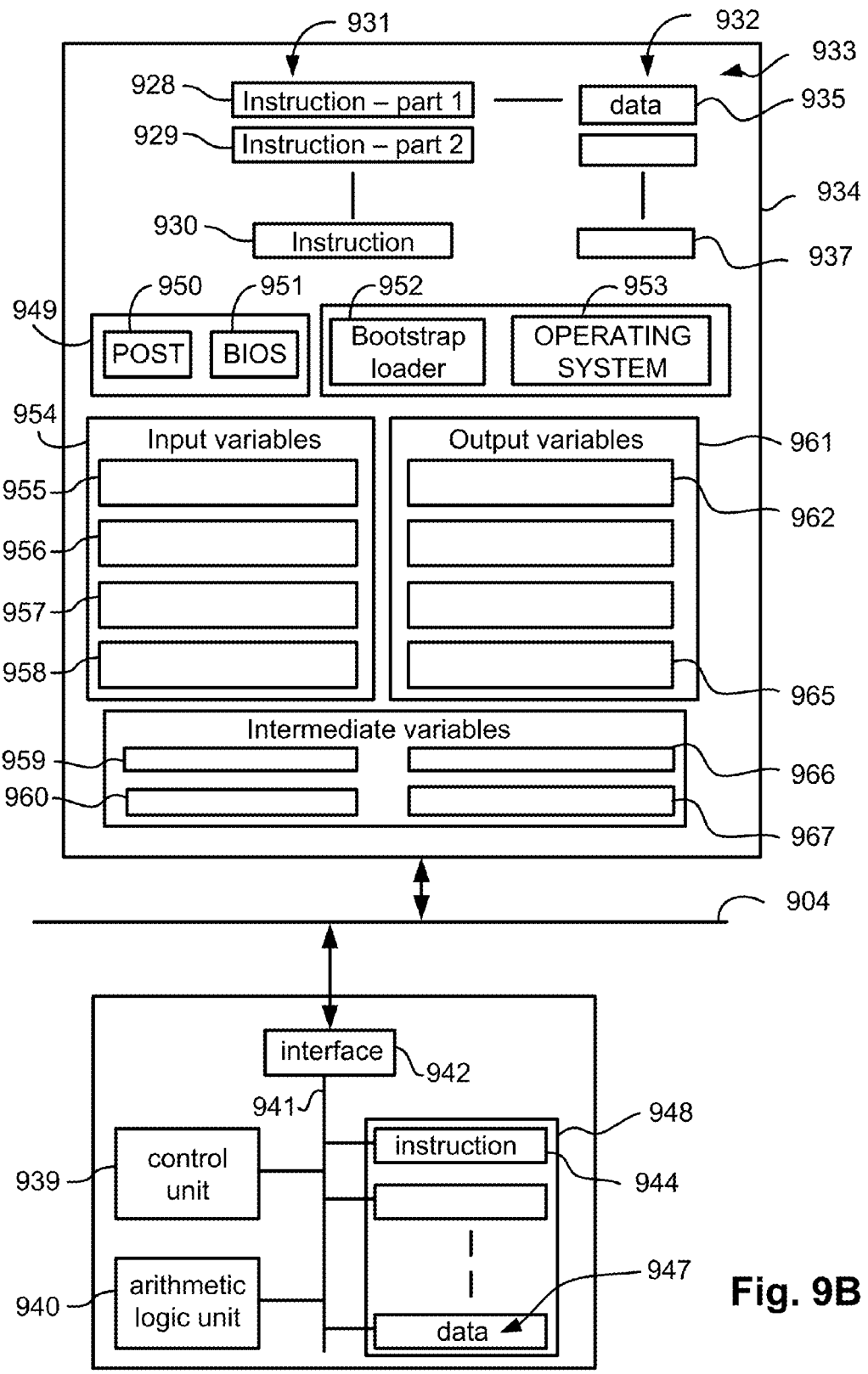

FIGS. 9A and 9B collectively form a schematic block diagram of a general-purpose computer system 900, upon which the various arrangements described can be practiced.

As seen in FIG. 9A, the computer system 900 is formed by a computer module 901, input devices such as a keyboard 902, a mouse pointer device 903, a scanner 926, a camera 927, and a microphone 980, and output devices including a printer 915, a display device 914 and loudspeakers 917. An external Modulator-Demodulator (Modem) transceiver device 916 may be used by the computer module 901 for communicating to and from a communications network 920 via a connection 921. The network 920 may be a wide-area network (WAN), such as the Internet or a private WAN. Where the connection 921 is a telephone line, the modem 916 may be a traditional "dial-up" modem. Alternatively, where the connection 921 is a high capacity (e.g., cable) connection, the modem 916 may be a broadband modem. A wireless modem may also be used for wireless connection to the network 920.

The computer module 901 typically includes at least one processor unit 905, and a memory unit 906 for example formed from semiconductor random access memory (RAM) and semiconductor read only memory (ROM). The computer module 901 also includes an number of input/output (I/O) interfaces including an audio-video interface 907 that couples to the video display 914, loudspeakers 917 and microphone 980, an I/O interface 913 for the keyboard 902, mouse 903, scanner 926, camera 927 and optionally a joystick (not illustrated), and an interface 908 for the external modem 916 and printer 915. In some implementations, the modem 916 may be incorporated within the computer module 901, for example within the interface 908. The computer module 901 also has a local network interface 911 which, via a connection 923, permits coupling of the computer system 900 to a local computer network 922, known as a Local Area Network (LAN). As also illustrated, the local network 922 may also couple to the wide network 920 via a connection 924, which would typically include a so-called "firewall" device or device of similar functionality. The interface 911 may be formed by an Ethernet™ circuit card, a Bluetooth™ wireless arrangement or an IEEE 802.11 wireless arrangement.

The interfaces 908 and 913 may afford either or both of serial and parallel connectivity, the former typically being implemented according to the Universal Serial Bus (USB)

standards and having corresponding USB connectors (not illustrated). Storage devices 909 are provided and typically include a hard disk drive (HDD) 910. Other storage devices such as a floppy disk drive and a magnetic tape drive (not illustrated) may also be used. An optical disk drive 912 is typically provided to act as a non-volatile source of data. Portable memory devices, such optical disks (e.g., CD-ROM, DVD), USB-RAM, and floppy disks for example may then be used as appropriate sources of data to the system 900.

The components 905 to 913 of the computer module 901 typically communicate via an interconnected bus 904 and in a manner that results in a conventional mode of operation of the computer system 900 known to those in the relevant art. Examples of computers on which the described arrangements can be practised include IBM-PC's and compatibles, Sun Sparcstations, Apple Mac™ or a like computer systems evolved therefrom.

The method of processing multi-view digital images each comprising a plurality of pixels may be implemented using the computer system 900 wherein the processes may be implemented as one or more software application programs 933 executable within the computer system 900. In particular, the steps of the method of processing multi-view digital images each comprising a plurality of pixels are effected by instructions 931 in the software 933 that are carried out within the computer system 900. The software instructions 931 may be formed as one or more code modules, each for performing one or more particular tasks. The software may also be divided into two separate parts, in which a first part and the corresponding code modules performs the methods of processing multi-view digital images each comprising a plurality of pixels and a second part and the corresponding code modules manage a user interface between the first part and the user.

The software 933 is generally loaded into the computer system 900 from a computer readable medium and is then typically stored in the HDD 910, as illustrated in FIG. 9A, or the memory 906, after which the software 933 can be executed by the computer system 900. In some instances, the application programs 933 may be supplied to the user encoded on one or more CD-ROM 925 and read via the corresponding drive 912 prior to storage in the memory 910 or 906. Alternatively the software 933 may be read by the computer system 900 from the networks 920 or 922 or loaded into the computer system 900 from other computer readable media. Computer readable storage media refers to any storage medium that participates in providing instructions and/or data to the computer system 900 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 901. Examples of computer readable transmission media that may also participate in the provision of software, application programs, instructions and/or data to the computer module 901 include radio or infra-red transmission channels as well as a network connection to another computer or networked device, and the Internet or Intranets including e-mail transmissions and information recorded on Websites and the like.

The second part of the application programs 933 and the corresponding code modules mentioned above may be executed to implement one or more graphical user interfaces (GUIs) to be rendered or otherwise represented upon the display 914. Through manipulation of typically the keyboard 902 and the mouse 903, a user of the computer system 900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 917 and user voice commands input via the microphone 980.

FIG. 9B is a detailed schematic block diagram of the processor 905 and a "memory" 934. The memory 934 represents a logical aggregation of all the memory devices (including the HDD 910 and semiconductor memory 906) that can be accessed by the computer module 901 in FIG. 9A.

When the computer module 901 is initially powered up, a power-on self-test (POST) program 950 executes. The POST program 950 is typically stored in a ROM 949 of the semiconductor memory 906. A program permanently stored in a hardware device such as the ROM 949 is sometimes referred to as firmware. The POST program 950 examines hardware within the computer module 901 to ensure proper functioning, and typically checks the processor 905, the memory (909, 906), and a basic input-output systems software (BIOS) module 951, also typically stored in the ROM 949, for correct operation. Once the POST program 950 has run successfully, the BIOS 951 activates the hard disk drive 910. Activation of the hard disk drive 910 causes a bootstrap loader program 952 that is resident on the hard disk drive 910 to execute via the processor 905. This loads an operating system 953 into the RAM memory 906 upon which the operating system 953 commences operation. The operating system 953 is a system level application, executable by the processor 905, to fulfil various high level functions, including processor management, memory management, device management, storage management, software application interface, and generic user interface.

The operating system 953 manages the memory (909, 906) to ensure that each process or application running on the computer module 901 has sufficient memory in which to execute without colliding with memory allocated to another process. Furthermore, the different types of memory available in the system 900 must be used properly so that each process can run effectively. Accordingly, the aggregated memory 934 is not intended to illustrate how particular segments of memory are allocated (unless otherwise stated), but rather to provide a general view of the memory accessible by the computer system 900 and how such is used.

The processor 905 includes a number of functional modules including a control unit 939, an arithmetic logic unit (ALU) 940, and a local or internal memory 948, sometimes called a cache memory. The cache memory 948 typically includes a number of storage registers 944-946 in a register section. One or more internal buses 941 functionally interconnect these functional modules. The processor 905 typically also has one or more interfaces 942 for communicating with external devices via the system bus 904, using a connection 918.

The application program 933 includes a sequence of instructions 931 that may include conditional branch and loop instructions. The program 933 may also include data 932, which is used in execution of the program 933. The instructions 931 and the data 932 are stored in memory locations 928-930 and 935-937 respectively. Depending upon the relative size of the instructions 931 and the memory locations 928-930, a particular instruction may be stored in a single memory location as depicted by the instruction shown in the memory location 930. Alternately, an instruction may be segmented into a number of parts each of which is stored in a separate memory location, as depicted by the instruction segments shown in the memory locations 928-929.

In general, the processor 905 is given a set of instructions which are executed therein. The processor 905 then waits for a subsequent input, to which it reacts to by executing another set of instructions. Each input may be provided from one or more of a number of sources, including data generated by one or more of the input devices 902, 903, data received from an external source across one of the networks 920, 922, data retrieved from one of the storage devices 906, 909 or data retrieved from a storage medium 925 inserted into the corresponding reader 912. The execution of a set of the instructions may in some cases result in output of data. Execution may also involve storing data or variables to the memory 934.

The disclosed arrangements use input variables 954, which are stored in the memory 934 in corresponding memory locations 955-958. The arrangements produce output variables 961, which are stored in the memory 934 in corresponding memory locations 962-965. Intermediate variables may be stored in memory locations 959, 960, 966 and 967.

The register section 944-947, the arithmetic logic unit (ALU) 940, and the control unit 939 of the processor 905 work together to perform sequences of micro-operations needed to perform "fetch, decode, and execute" cycles for every instruction in the instruction set making up the program 933. Each fetch, decode, and execute cycle comprises:

(a) a fetch operation, which fetches or reads an instruction 931 from a memory location 928;

(b) a decode operation in which the control unit 939 determines which instruction has been fetched; and (c) an execute operation in which the control unit 939 and/or the ALU 940 execute the instruction.

Thereafter, a further fetch, decode, and execute cycle for the next instruction may be executed. Similarly, a store cycle may be performed by which the control unit 939 stores or writes a value to a memory location 932.

Each step or sub-process in the processes of FIGS. 2A, 2B, and 4 is associated with one or more segments of the program 933, and is performed by the register section 944-947, the ALU 940, and the control unit 939 in the processor 905 working together to perform the fetch, decode, and execute cycles for every instruction in the instruction set for the noted segments of the program 933.

The encoder 200, the encoder 250, and the decoder 400 of FIGS. 2A, 2B, and 4, respectively, may alternatively be implemented in dedicated hardware such as one or more integrated circuits. Such dedicated hardware may include Field-programmable gate array (FPGA), application-specific integrated circuit (ASIC), graphic processors, digital signal processors, or one or more microprocessors and associated memories.

In one implementation, the encoder 200, the encoder 250, and the decoder 400 are implemented within a camera, where the encoder 200, the encoder 250, and the decoder 400 may be implemented as software being executed by a processor of the camera, or may be implemented using dedicated hardware within the camera.

In another implementation, only the encoder 200 and the encoder 250 are implemented within a camera. The encoder 200 and the encoder 250 may be implemented as software executing in a processor of the camera, or implemented using dedicated hardware within the camera.

In yet a further implementation, the encoder 200 and the encoder 250 are implemented separately within two independent cameras. The encoder 200 and the encoder 250 may be implemented as software executing in a processor of the camera, or implemented using dedicated hardware within the camera.

Conventional Camera

As noted hereinbefore, the conventional camera 124 may compress the captured images using a conventional compression method prior to data transmission using the system 250 as shown in FIG. 2B. In the system 250 of FIG. 2B, the input image (input video frame) 251 is read by an intra-frame (I) encoder 252 implemented using the processor 905 of FIG. 9. The compression method used by the intra-frame encoder 252 may be JPEG, JPEG2000, Motion JPEG, Motion JPEG2000, MPEG1, MPEG2, MPEG4, or H.264 to produce the compressed image 253.

Wyner-Ziv Encoder

The other cameras 122 and 126 of FIG. 1 perform Wyner-Ziv (WZ) encoding and generate parity bits using the pixel-domain WZ encoder 200 of FIG. 2A, which comprises a bit plane extractor 220 and a turbo encoder 230.

In an alternative embodiment, the cameras 122 and 126 are transform-domain Wyner-Ziv encoders. These encoders are identical to the pixel-domain Wyner-Ziv encoder 200 of FIG. 2A except these encoders have an additional pre-processing step (not illustrated). This pre-processing step includes (i) transforming the pixel values of the input image 210 to transform coefficients and (ii) forming coefficient bands by concatenating coefficients of the same importance. The transformation is preferably a DCT-based transform. Alternative transforms such as wavelet, Fourier, and Hadamard transform can also be used.

Referring back to FIG. 2A, the bit plane extractor 220 reads the raw pixel values from a camera sensor and performs the step of extracting bits from pixel values to form a single bit stream for each bit plane. This may be done using the processor 905 of FIG. 9. Preferably, scanning starts on the most significant bit plane of the input video frame 210 input to the WZ encoder 200 and the most significant bits of the coefficients of the input video frame 210 are concatenated to form a bit stream containing the most significant bits. In a second pass, the scanning concatenates the second most significant bits of all coefficients of the frame 210. The bits from the second scanning path are appended to the bit stream generated in the previous scanning path. The scanning and appending continues in this manner until the least significant bit plane is completed. This generates one bit stream for each input video frame 210.

In the exemplary embodiment, the bit plane extractor 220 extracts every pixel in the input video frame 210. Again this may be done using the processor 905. In an alternative embodiment, not every pixel is processed. In this instance, the bit plane extractor 220 is configured to extract a specified subset of pixels within each bit plane to generate a bit stream containing bits for spatial resolutions lower than the original resolution.

The turbo encoder 230 implemented using the processor 905 of FIG. 9 encodes the bit stream output from the bit plane extractor 220 according to a bitwise error correction method to produce a stream of parity bits 240. For each bit plane of the input video frame 210, parity bits are generated. Accordingly, if the bit depth of the input video frame 210 is eight, eight sets of parity bits are produced where each parity bit set refers to one bit plane only. The punctured parity bit stream 240 output by the turbo encoder 230 of FIG. 2 is then transmitted to a storage or transmission medium 130.

Turbo Encoder of WZ Encoder

Figure 3:
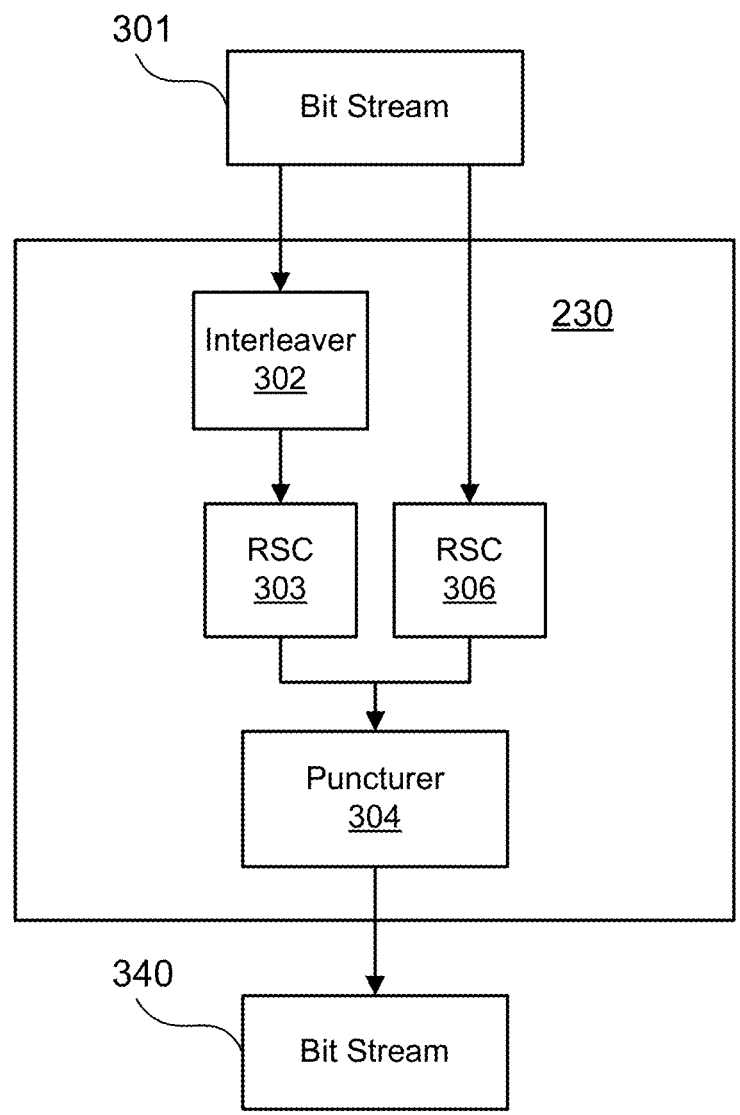
FIG. 3 is a schematic block diagram of a turbo encoder in FIG. 2.

FIG. 3 illustrates in detail the turbo encoder 230 of FIG. 2A. The turbo encoder 230 comprises an interleaver module 302, two recursive systematic coder (RSC) modules 303, 306, and a puncturer module 304. According to a bitwise error correction method, the turbo encoder module 230 encodes the bit stream 301 output from the bit plane extractor 220 of FIG. 2A and produces as its output a punctured bit stream 340.

The interleaver module 302 of the turbo encoder module 230 interleaves the bit stream 301 (the information bit stream). In the exemplary embodiment, the interleaver module 302 is a block interleaver. However, in alternative embodiments, any of a number of known interleavers, e.g., a random or pseudo-random interleaver, or a circular-shift interleaver, may be used.

The output from the interleaver module 302 is an interleaved bit stream, which is passed on to a recursive systematic coder (RSC) module 303, which produces parity bits. In the exemplary embodiment, the RSC module 303 produces one parity bit per input bit and is generated using the octal generator polynomials 7 (binary $111_2$) and 5 (binary $101_2$).

The further recursive systematic coder module 306 operates directly on the bit stream 301 from the bit plane extractor 220. In the exemplary embodiment, the recursive systematic coder modules 303 and 306 are substantially identical. Both recursive systematic coder modules 303 and 306 output a parity bit stream to a puncturer module 304, with each parity bit stream being equal in length to the input bit stream 301.

The puncturer module 304 of FIG. 3 deterministically deletes parity bits to reduce the parity bit overhead previously generated by the recursive systematic coder modules 303 and 306. Typically, for the purpose of data compression, at least half of the parity bits generated need to be punctured, which means that, for example, half of the parity bits from each recursive systematic encoder module 303 and 306 are deleted. In an alternative embodiment, the puncturer module 304 may depend on additional information, such as the bit plane of the current information bit. In yet another alternative embodiment, the scheme employed by the puncturer module 304 may depend on the spatial location of the pixel to which the information bit belongs, as well as the frequency content of the area around this pixel.

The turbo encoder 230 produces as output the punctured parity bit stream 340 (240 in FIG. 2A), which comprises parity bits produced by recursive systematic coder modules 303 and 306.

Distributed Multi-View Decoder

The operation of the distributed multi-view video decoder 140 of FIG. 1, which may be implemented using the processor 905 and memory 906 of FIG. 9, is described in detail hereinafter with reference to FIG. 4. The inputs of the decoder 400 comprise low-resolution images (parity) 410 and 415 from WZ cameras, such as cameras 122 and 126, and a high-resolution image 420 from a conventional camera. The decoder 400 receives a bit stream of pixel values 420 output from the conventional video camera 124 of FIG. 1. In the exemplary implementation, the bit stream comprises raw pixel values of the high-resolution image 420 captured by the conventional camera 124, also referred as the centre image in one arrangement, and is processed by a down-sampler module 430.

In an alternative implementation, the high-resolution image 420 represents a compressed bit stream. In that case, an intra-frame decoder (not illustrated) performs the inverse operation of the intra-frame encoder 252 of FIG. 2B to reconstruct the pixel values of the centre image as a pre-processing step.

The resolution of the centre image 420 is reduced in the down-sampler module 430 to the resolution of the low resolution images represented in the form of parity bits 410 and 415. These low resolution images 410, 415 are referred as side views hereinafter, since those images 410, 415 represent views from each side of the centre camera 124 of FIG. 1. In the exemplary implementation, the down-sampler module 430 comprises a down sampling filter with a cubic kernel. Alternative down sampling methods, such as the nearest neighbour, bilinear, bi-cubic, and quadratic down sampling filters using various kernels such as Gaussian, Bessel, Hamming, Mitchell or Blackman kernels, may be employed by the down-sampler module 430. The scaled centre image 435 is later used to perform Wyner-Ziv decoding in decoders 440 and 442 to obtain the two side views and to perform disparity estimation in modules 450 and 452, which determines the correspondence between two images. The Wyner-Ziv decoder 440 of FIG. 4 (and decoder 442) performs the operation of joint decoding on a parity bit stream 410 and the down-sampled centre image 435 output from the down-sampler module 430.

The decoder system 400 receives bit streams 410 and 415 containing parity information for a view of the 3D scene from two different viewpoints. The bit streams 410 and 415 represent the two parity bit streams generated by the two Wyner-Ziv video cameras (encoders) 122 and 126 shown in FIG. 1.

In FIG. 4, the Wyner-Ziv decoder 440 receives the parity bit stream 410 from the Wyner-Ziv encoder 122 and a prediction of the side view from the down-sampler module 430, i.e. a lower resolution version of the high-resolution image 420. The Wyner-Ziv decoder 440 performs the operation of Wyner-Ziv decoding on each bit plane of the bit stream 410 and reconstructs the pixel values of the side view from the decoded bit stream. The decoded image 445 represents the low-resolution version of the side view captured by the encoder 122 of FIG. 1. The operation of the Wyner-Ziv decoder 440 is described in detail hereinafter with reference to FIG. 5. In this manner, a reconstructed side view is constructed in the WZ decoder module 440 using a version of the digital image 420 captured from the conventional camera 124 and the parity bits 410 generated from the digital image captured by the camera 122, where the images 420 and 410 are captured at different resolutions.

A disparity estimation module 450 estimates an inter-view disparity map 455 between the decoded side view 445 and scaled centre image 435 output from the down-sampler module 430. The resulting disparity map 455 provides a one-to-one mapping of the corresponding pixel positions between the two images 435 and 445, which can be used to perform disparity compensation. This disparity map 455 is low resolution relative to the high-resolution image 420. A detailed description of the operation of the disparity estimation modules 450, 452 is provided hereinafter with reference to FIG. 8.

The low-resolution disparity map 455 output from the disparity estimation module 450 is adjusted by a disparity interpolation module 460 to compensate for the difference in resolution of the images 410 and 420. In the exemplary implementation, the low-resolution disparity map 455 is up-scaled using an up-sampling filter with a cubic kernel. Other upsampling methods, such as the nearest neighbour, bilinear, or bi-cubic, may be employed by the disparity interpolation module 460 to convert the low-resolution disparity map 455 into a high-resolution disparity map 465. Thus, a disparity map between the reconstructed side view image 445 and the high-resolution image 420 is determined by modules 450 and 460. In an alternative configuration (not shown in FIG. 4), the disparity map is generated as follows: first the reconstructed side view image 445 is interpolated by the disparity interpolation module 460 and then the disparity estimation is performed by module 450 at the resolution of the centre image 420.

In yet another implementation, the functionality of the disparity interpolation module 460 is integrated into the disparity estimation module 450. Consequently, the disparity estimation module 450 estimates the disparity matching between the two images according to a sub-pel pixel grid matching the resolution of centre image 420. The output of the disparity estimation module 450 in this implementation produces a disparity map at the resolution of the centre image 420.

The disparity interpolation module 460 is followed by a disparity compensation module 470. The disparity compensation module 470 has two inputs: the high-resolution disparity map 465 output from the disparity interpolation module 460; and the high-resolution centre image 420. The disparity compensation module 470 performs the operation of disparity compensation on the high-resolution centre image 420 to generate a side view at the same resolution as the centre image 420.

In the exemplary implementation, the generation of the pixel values in the side view image 490 is performed on a pixel-by-pixel basis. At each pixel position in the decoded image 490, the corresponding disparity value is extracted from the interpolated disparity map 465. The extracted disparity value is added to the current pixel position to locate a reference pixel in the high-resolution centre image 420. The value of the reference pixel in the high-resolution centre image 420 is used as the final pixel value of the current pixel position in the side view image 490. Such an inter-view prediction operation runs through all the pixel positions of the side view image 490 in a raster-scan order. The output of this operation is a high-resolution side view 490 of the 3D scene 110 of FIG. 1 at the viewpoint of the Wyner-Ziv video encoder 122 (FIG. 1).

The high-resolution image 495 is generated from the image 420 and a parity bit stream 415 in an identical manner. The modules 442, 452, 462, and 472 are identical or substantially identical to the modules 440, 450, 460, and 470, respectively, and produce outputs 447, 457, 467, and 495. The Wyner-Ziv decoder 442 performs the operation of Wyner-Ziv decoding using the down-sampled image 435 from the down-sampler module 430 and the parity bit stream 415. A low-resolution disparity map 457 is generated by the disparity estimation module 452. The disparity map 457 is modified by the disparity interpolation module 462 to account for the difference in resolution of the images 420 and 415. A high-resolution side image 495 is generated by performing disparity compensation in the disparity compensation module 472 using the interpolated disparity map 467 at the viewpoint of the second Wyner-Ziv encoder 126 (FIG. 1).

The outputs of the decoder 400 are the high-resolution image 422 in FIG. 4 (in this case identical to the input image 420) and the two high-resolution side views 490 and 495 taken at the viewpoints of the two WZ cameras 122 and 126, respectively.

In an alternative embodiment, the high-resolution image 420 in FIG. 4 can be enhanced by exploiting the properties of the 3D objects in the scene (e.g., position, color, intensity, and object boundaries etc) and the locations of the light sources to remove block artefacts and to improve image regions of over- and under-exposures. This embodiment is now described in more detail hereinafter with reference to FIG. 10.

Figure 10:
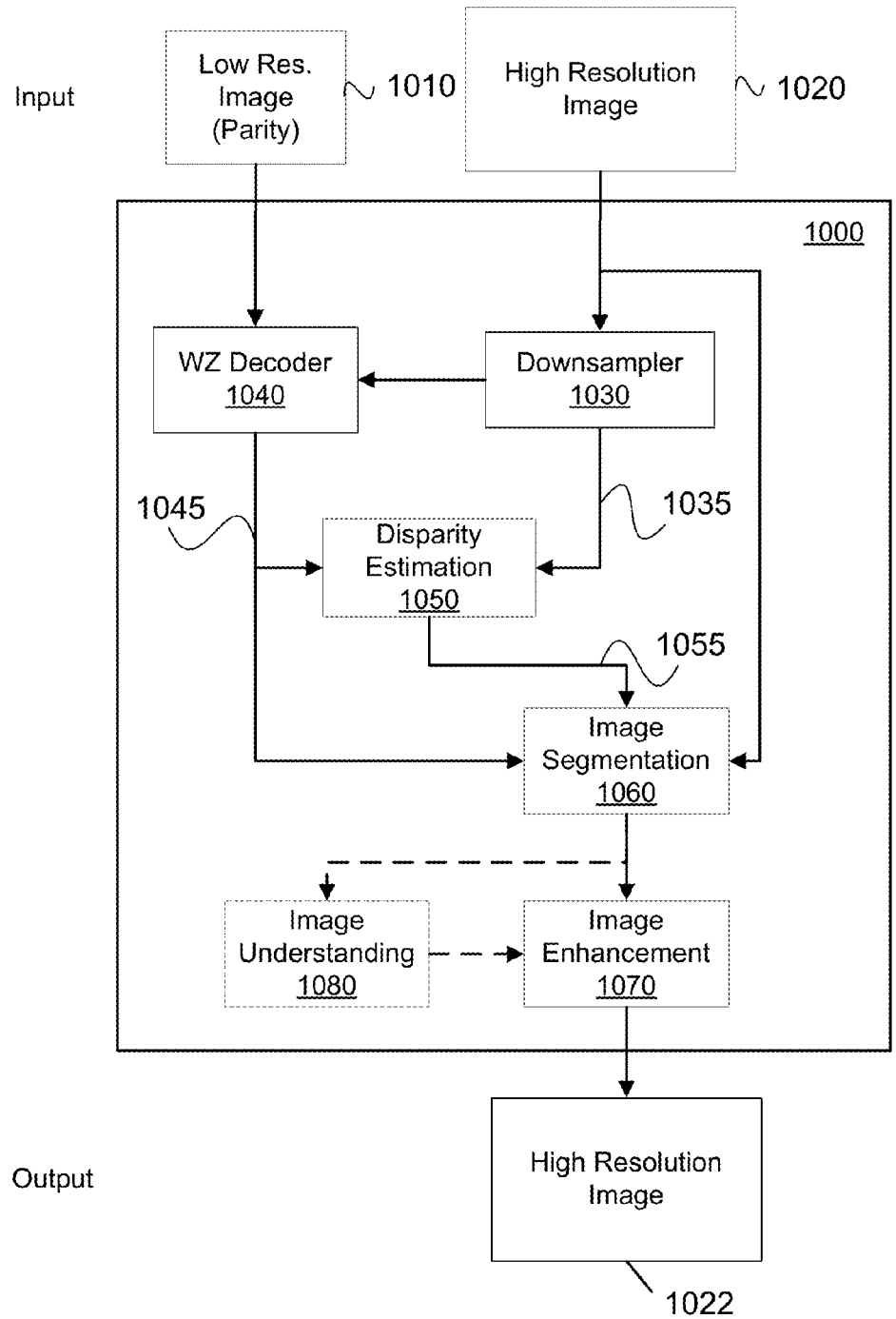
FIG. 10 is a schematic block diagram of a distributed multi-view video decoder in accordance with another embodiment of the invention.

In FIG. 10, the down-sampler module 1030, the Wyner-Ziv decoder module 1040, and the disparity estimation module 1050 of this embodiment are substantially identical to the modules 430, 440, and 450 in FIG. 4, respectively. The decoder system 1000 receives a parity bit stream 1010 representing a low-resolution image from a WZ camera (122 or 126 in FIG. 1) and a bit stream 1020 representing pixel values of the high-resolution image from a conventional video camera 124 in FIG. 1. The parity bit stream 1010 is input to the WZ decoder 1040, and the bit stream 1020 is input to the downsampler 1030 (as well as the image segmentation module 1060 described hereinafter).

The resolution of the high-resolution image 1020 is reduced in the down-sampler module 1030 to match the dimension of the low-resolution image 1010. The WZ decoder 1040 receives the parity bit stream 1010 and uses the scaled image from the down-sampler module 1030 as a prediction to re-construct the digital image representing the view captured by the WZ camera. The disparity estimation is performed by module 1050 to estimate the inter-view correlation between the decoded image 1045 and the scaled image 1035 output from the down-sampler module 1030. The output 1055 of the disparity estimation module 1050 comprises a disparity map representing the pixel displacement between the two images 1035 and 1045 and the perspective transformation between the cameras capturing the two input images 1010 and 1020.

The high-resolution image 1020, the decoded image 1045, and the disparity map 1055 are input to the image segmentation module 1060. The image segmentation module 1060 partitions the image 1020 into multiple segments. Each image segment represents a 3D object in the scene. Based on the disparity map 1055 derived from the images 1020 and 1045, the image segmentation module 1060 computes the properties of each 3D objects (e.g., position, color, intensity, object boundaries, etc). In this exemplary embodiment of FIG. 10, the image segmentation module 1060 employs a k-means clustering algorithm. Alternative methods such as histogram-based methods, edge detection methods, region growing methods, graph partitioning methods, model-based segmentation and multi-scale segmentation may be employed.

The properties of 3D objects that are output from the image segmentation module 1060 are used as input to an image enhancement module 1070. In the exemplary embodiment, the image enhancement module 1070 performs edge sharpening operations along object boundaries. The sharpening filter uses a linear adaptive kernel. The shape and coefficients of the kernel are adapted to the segmentation of the 3D object and the gradient of the object boundaries. Alternatively, other adaptive filters may be employed. One example of such another adaptive filter is an orientation-based sharpening filter. Another alternative is a partial differential equation (PDE) based approach that may be employed.

Moreover, the image enhancement module 1070 can enhance the contrast and appearance of texture regions based on the segmentation of the 3D objects. The output of the image enhancement module 1070 is an enhanced high-resolution image 1022.

Furthermore, the decoder system 1000 may optionally include an image understanding module 1080 (marked in dotted lines), which receives the output of the image segmentation module 1060 and provides its output as an additional input to the image enhancement module 1070.

Based on the properties of the 3D objects derived from image segmentation module 1060, the image understanding module 1080 identifies the detected 3D objects from a database of pre-defined object primitives. The pre-defined object primitives may include animals such as cats and dogs, furniture such as tables and chairs, foods such as oranges and apples, and machinery such as desktop computers and cars.

These are only a few examples of relevant object primitives that may be stored in the database. In addition, these object primitives may provide further information about the objects such as the transparency of the objects, the exact size and dimensions of the objects, texture information, and an object's surface structures. This provides useful information to the module 1070 for image enhancement. The module 1080 may further explore the conceptual relationship among the 3D objects based on detected object primitives and their layout. The output of the image enhancement module 1070 is a high resolution image 1022, which is enhanced to achieve a desired visual or photographic appearance.

In yet another alternative embodiment, the decoder systems 400 and 1000 are combined. When combined the decoder system 400 can be used to produce enhanced high-resolution video frames from the low resolution images 410 or 415. The decoder system 1000 is then used to enhance the high resolution image 420 as described previously.

Having described the decoder systems 400 and 1000 for generating high-resolution video frames from low-resolution Wyner-Ziv frames, several components of the decoder 400 are described hereinafter in more detail, starting with the Wyner-Ziv decoder 440, 442 with reference to FIGS. 1 and 5.

Wyner-Ziv Decoder

Figure 5:
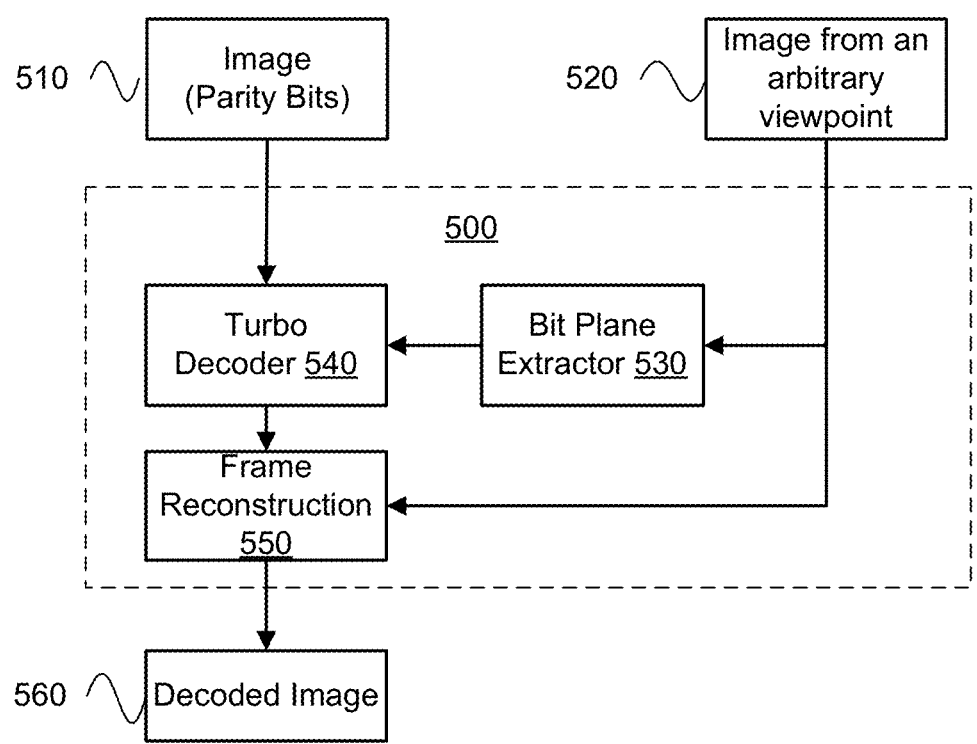
FIG. 5 is a schematic block diagram of a pixel-domain Wyner-Ziv decoder of FIG. 4.

FIG. 5 shows a schematic diagram of the Wyner-Ziv decoder 440, 442. Each Wyner-Ziv decoder 440, 442, represented by system 500 in FIG. 5, comprises a bit plane extractor 530, a turbo decoder 540, and a frame reconstruction module 550. The system 500 may be implemented as software, preferably resident on the hard disk drive 910 of FIG. 9 and is controlled in its execution by the processor 905. Alternatively, the Wyner-Ziv decoder 500 can be implemented as a dedicated hardware for fast decoding performance. The two bit streams input to the decoder 500 are bit streams 510 and 520, respectively. The bit streams are parity bits 510 and the image from a different viewpoint 520, e.g. the centre image, as side information.

The bit plane extractor 530 is substantially identical to the bit plane extractor 220 in FIG. 2A, reads pixel values of an image from the bit stream 520, and extracts bits from the read pixel values to form a single bit stream for each bit plane. Preferably, scanning starts on the most significant bit plane of the image 520, and the most significant bits of the coefficients of image 520 are concatenated to form a bit stream. In a second pass, the scanning of the extractor 530 concatenates the second most significant bits of all coefficients of the image 520. The bits from the second scanning path are appended to the bit stream generated in the previous scanning path. The scanning and appending of the bit plane extractor 530 continues in this manner until the least significant bit plane is completed. This generates one bit stream for the image 520. In the exemplary embodiment, the bit plane extractor 530 extracts every pixel in the image 520.

In an alternative embodiment, not every pixel is processed; the bit plane extractor 530 is configured to extract a specified subset of pixels within each bit plane to generate a bit stream containing bits for spatial resolutions lower than the original resolution.

The WZ decoder 500 further comprises a turbo decoder 540, which is described in detail hereinafter with reference to FIG. 6. The turbo decoder 540 operates on each bit plane of the output of the bit plane extractor 530 to correct at least a portion of that current bit plane. In a first iteration, the turbo decoder 540 receives the parity bits for the first (most significant) bit plane from the bit stream output from the bit plane extractor 530 as side information. The turbo decoder 540 uses the parity bits for the first bit plane to improve the approximation (or determine a better approximation) of the first bit plane of the image 510. The turbo decoder 540 outputs a decoded bit stream representing a decoded first bit plane. The above process repeats for lower bit planes unit all bit planes are decoded. Accordingly, the turbo decoder 540 performs the step of using parity bits to determine a decoded bit stream representing a better approximation of the image 510.

A frame reconstruction module 550 processes the decoded bit stream output by the turbo decoder module 540 to determine pixel values for the decoded bit stream. In the exemplary embodiment, the most significant bits of the pixel values of the image 510 are first determined by the turbo decoder 540. The second most significant bits of the pixel values of the image 510 are then determined and concatenated with the first most significant bits of the pixel values of the image 510. This process repeats for lower bit planes until all bits are determined for each bit plane of the image 510. In other embodiments, the frame reconstruction module 550 may use pixel values of the image 520 and the information produced by the turbo decoder 540 to obtain the pixel values for the decoded bit stream. The resulting pixel values output from the frame reconstruction module 550 form the output image 560.

Turbo Decoder

The turbo decoder 540 is now described in detail with reference to FIG. 6. The parity bits 600 in the bit stream 510 of FIG. 5 are split into two sets of parity bits: one set 620 of the parity bits originates from the recursive systematic coder module 303 (FIG. 3) and the other set 640 of parity bits originates from the recursive systematic coder module 306 (FIG. 3).

The parity bits 620 are input to a component decoder module 660, which preferably employs the Soft Output Viterbi Decoder (SOVA) algorithm. Alternatively, a Max-Log Maximum A Posteriori Probability (MAP) algorithm may be employed. In yet another alternative embodiment, variations of the SOVA and the MAP algorithms may be used. In a similar manner, parity bits 640 are input to a component decoder module 670. The component decoder module 660 (and 670) is described in detail hereinafter with reference to FIG. 7.

Systematic bits 610 from the bit plane extractor 530 of FIG. 5 are passed as input to an interleaver module 650 and to component decoder 670. This interleaver module 650 is coupled to the component decoder module 660.

The turbo decoder 540 works iteratively. A loop is formed starting from the component decoder module 660 to an adder 665, to a deinterleaver module 680, to the component decoder module 670, to an adder 675, to interleaver module 690, and back to component decoder module 660.

The component decoder module 660 has three inputs: the parity bits 620, the interleaved systematic bits from the interleaver module 650, and the output from the interleaver module 690, which is the output of the second component decoder module 670 modified in the adder 675 and interleaved in the interleaver module 690. The input of the component decoder module 660 from the other component decoder module 670 provides information about the likely values of the bits to be decoded. This information is typically provided in terms of the Log Likelihood Ratios:

$$L(u_k) = \ln\left(\frac{P(u_k = +1)}{P(u_k = -1)}\right),$$

where: $P(u_k=+1)$ denotes the probability that the bit $u_k$ equals +1, and $P(u_k=-1)$ denotes the probability that the bit $u_k$ equals −1.

In the first iteration, the feedback input from the component decoder 670 does not exist. Therefore, in the first iteration, the feedback input to the component decoder 660 from the component decoder 670 is set to zero.

The (decoded) bit sequence produced by the component decoder module 660 is passed on to the adder 665, where a priori information related to the bit stream is produced. The received interleaved systematic bits 650 are extracted in the adder 665. The adder also receives the output of the interleaver module 650 and the interleaver module 690 ("−" indicating subtraction). The information produced by the component decoder module 670 (which are processed analogously in adder 675 and interleaved in interleaver module 690) is extracted as well. Left over is the a priori information, which gives the likely value of a bit. This information is valuable for the next decoder.

After the adder 665, the resulting bit stream is de-interleaved in a deinterleaver module 680, which performs the inverse operation of the interleaver module 650. The de-interleaved bit stream from deinterleaver module 680 is provided as input to a component decoder module 670. In the exemplary embodiment, the component decoder module 670 and the adder 675 work analogously to the component decoder module 660 and the adder 665 described hereinbefore. The resulting bit stream is again interleaved in the interleaver module 690 and used as input for the second iteration to the first component decoder module 660.

In the exemplary embodiment, eight iterations between the first component decoder module 660 and the second component decoder module 670 are carried out. After completion of eight iterations, the resulting bit stream produced from the component decoder module 670 is the output 695.

In an alternative embodiment, the stopping criteria of the iterative decoding process is determined by the quality of the decoded bits. One such method is to use the Log-Likelihood Ratios (LLRs) of the decoded bits as a measure of the decoding quality. The decoding process is terminated if and only if either all decoded bits have LLRs larger than a given threshold or the maximum number of iterations is reached.

Component Decoder Module

Figure 6:
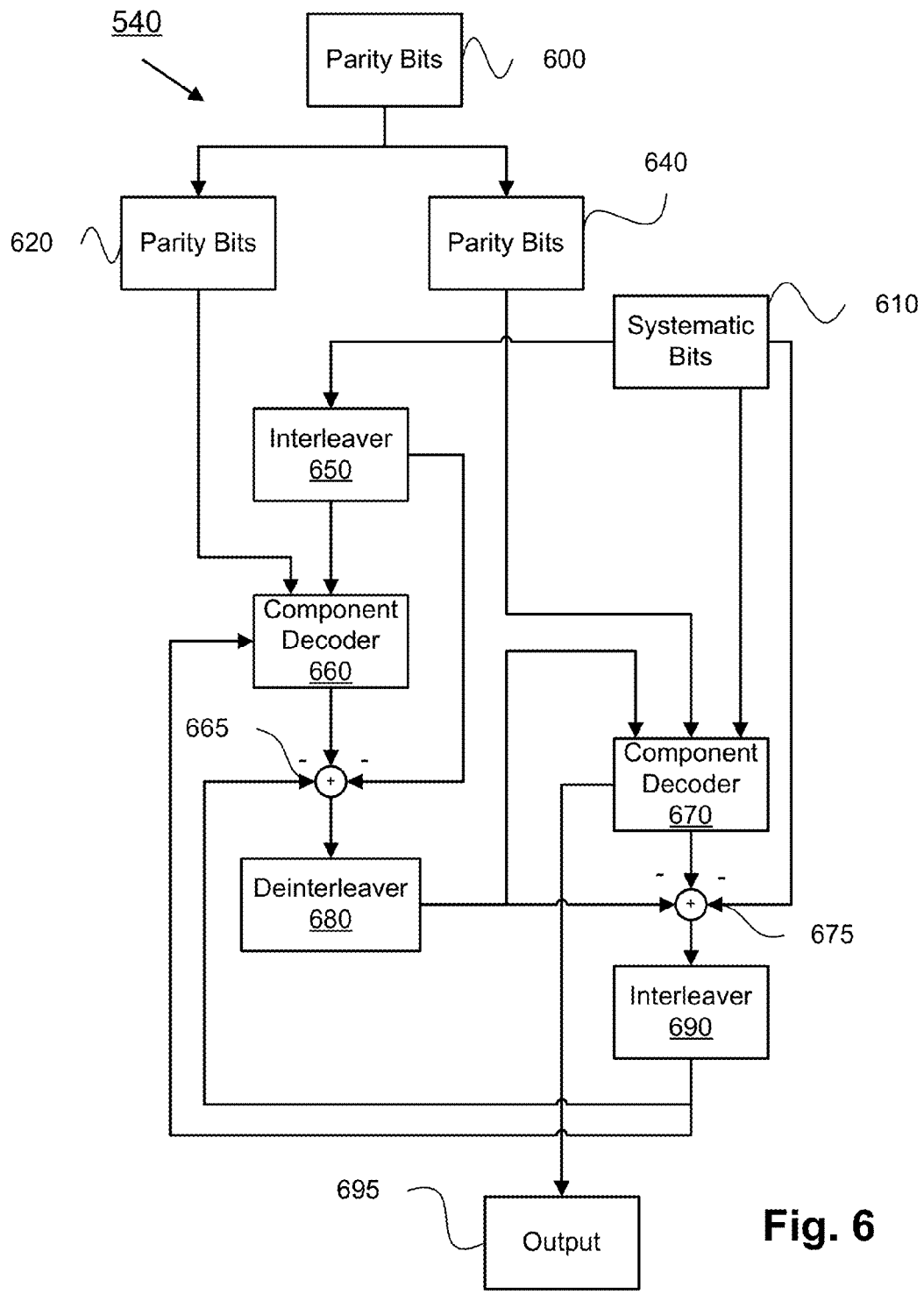
FIG. 6 is a schematic block diagram of a turbo decoder of FIG. 5.
Figure 7:
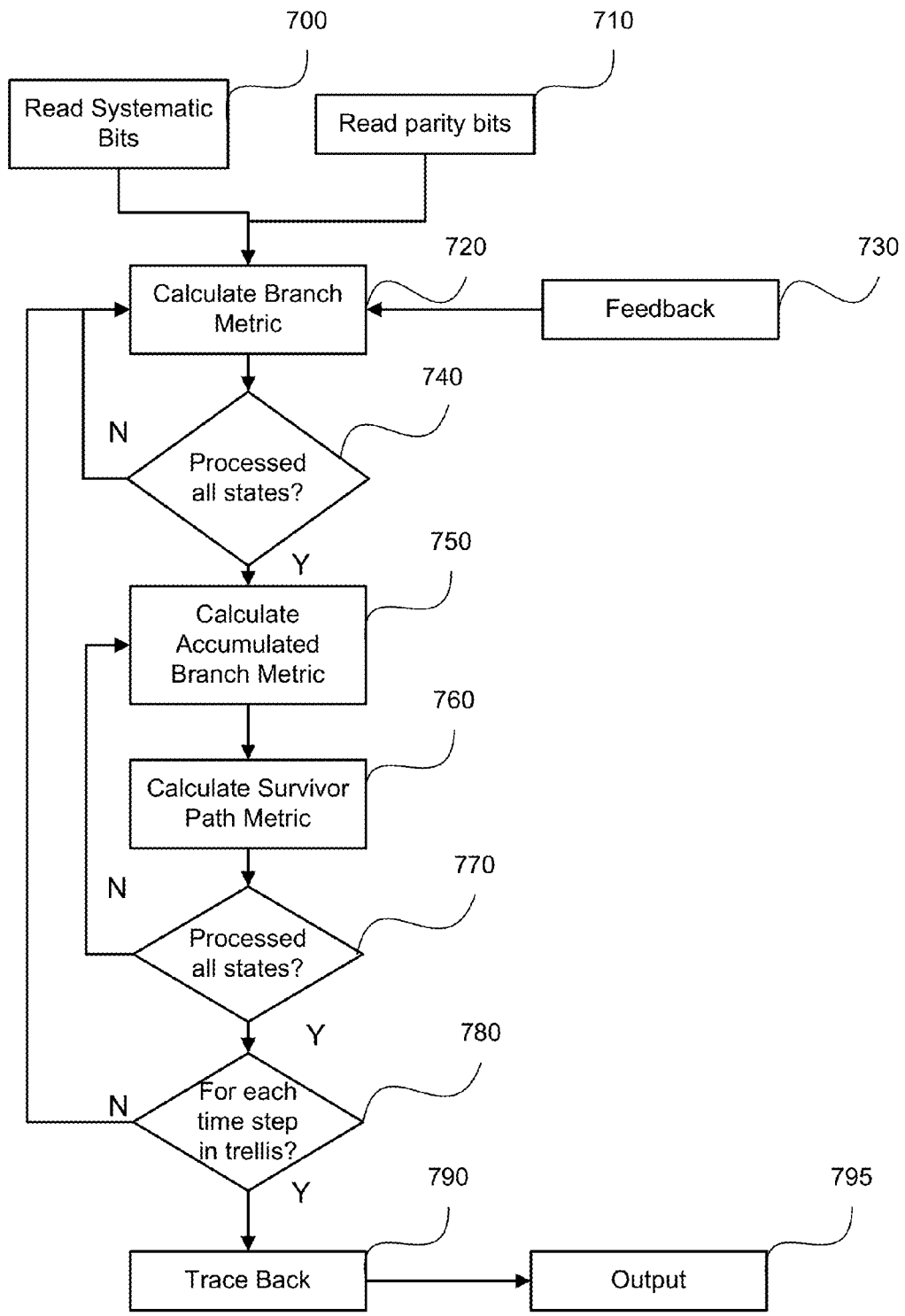
FIG. 7 is a flow diagram illustrating the process performed in a component decoder of the turbo decoder of FIG. 6.

FIG. 7 shows the process performed by the component decoder module 660 (and 670) of FIG. 6. In general, the two component decoder modules 660 and 670 need not be identical. However, in the exemplary embodiment, the component decoder modules 660 and 670 are identical or substantially identical. The component decoder module 660 commences operation by reading the systematic bits 610 (FIG. 6) in step 700. As noted above, the systematic bits 610 are the output of the bit plane extractor 530 of FIG. 5. In step 710, the parity bits 620 (FIG. 6) are read. Processing continues at step 720, where a branch metric is calculated. The branch metric is a measure for the decoding quality for the current code word. The branch metric is zero if the decoding of the current code word is error free. Code word decoding errors sometimes cannot be avoided and can still result in an overall optimal result. Branch metrics are well known in the art.

The calculation of the branch metric is performed in step 720 by getting feedback 730 from the other component decoder module 670 (FIG. 6) in the form of the Log Likelihood Ratios, described hereinbefore. The Log Likelihood Ratios, and as such the calculation of the branch metrics (in step 720), is based on a model of the noise to be expected in the systematic bits 610 of FIG. 6. In the exemplary embodiment, the Laplace noise model is employed to compensate for errors in the systematic bits 610.

The noise to be expected on the systematic bits 610 originates from down-sampling and mismatch between two different viewpoints. Modelling this noise is generally difficult as reconstruction noise is generally signal-dependent (e.g. Gibbs phenomenon) and spatially correlated. In general, the errors are not independently, identically distributed. Channel coding techniques, e.g. turbo codes, assume independent, identically distributed noise.

In FIG. 7, a decision step 740 checks to determine whether all states of a trellis diagram have been processed. A trellis diagram depicts the full history of state transitions of a state machine (e.g., a component decoder). Each state transition is associated with a cost (e.g., branch metric), which is a measure of the likelihood of that state transition given the input bits to the component decoder and is computed for each possible state transition. If all states of the trellis diagram have not been processed (N), then processing returns at step 720. If step 740 determines that the branch metrics for all states of the trellis diagram have been calculated (Y), processing continues at step 750, where an accumulated branch metric is calculated. The accumulated branch metric represents the sum of previous code word decoding errors, which is the running sum of all previous branch metrics. Processing continues at step 760.

In step 760, survivor path metrics are calculated. This survivor path metric represents the lowest overall sum of previous branch metrics, indicating what is the optimal decoding to date, and is computed for each state of the state machine.

In decision step 770, a check is made to determine if all of the states have been processed. If a survivor path metric has not been computed for any of the states in the state machine (N), processing within the component decoder module 660 returns to step 750. Otherwise (Y) if a survivor path metric has been computed for all of the states, processing moves on to the next time step of the trellis diagram in decision step 780.

The decision step 780 determines whether the survivor path metric is calculated for all time steps in the trellis diagram. If the survivor path metric is not completed (N), processing returns to step 720. Otherwise, the end of the trellis is reached and the survivor path metric is computed for all time steps in the trellis diagram (Y), from step 780 processing continues at step 790 where trace back is calculated. The trace back operation uses the obtained knowledge, being the branch metrics, the accumulated branch metric and the survivor path metrics, of which is the best decoding metric (indicating the decoding quality) to generate the decoded bit stream 795. The output of step 790 is the final output 795 of the component decoder module 660.

Disparity Estimation Module

Figure 8:
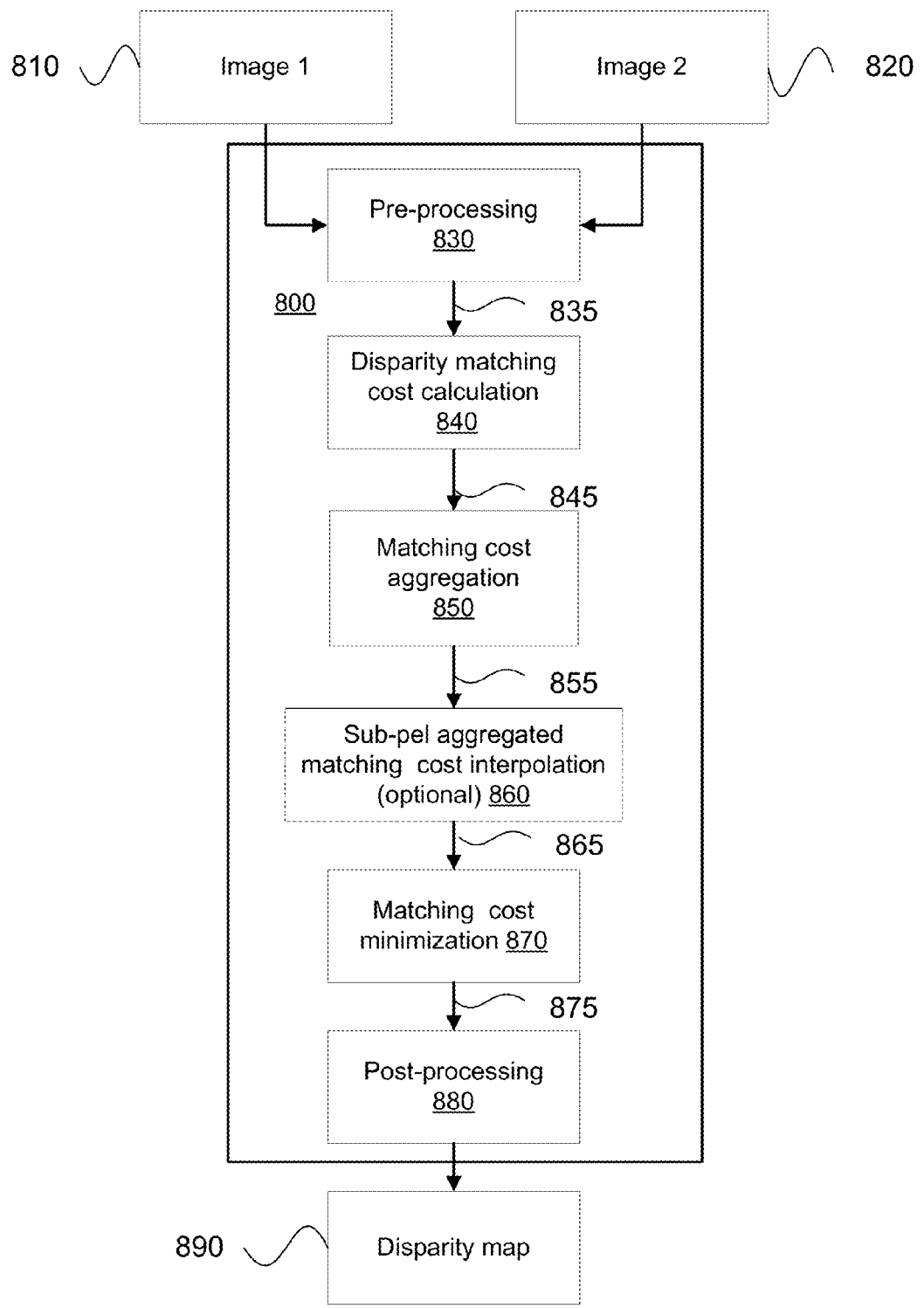
FIG. 8 is a flow diagram of a disparity estimation module 450 (and 452) in FIG. 4.

FIG. 8 shows the steps performed by the disparity estimation module 800 (i.e., the modules 450 and 452 of FIG. 4). The disparity estimation module 800 has two inputs: a first image 810 captured from a first viewpoint, and a second image 820 from a second viewpoint. Preferably, these two images 810, 820 from different views are at the same resolution. In the exemplary implementation, the input image 810 corresponds to the decoded image 445 output from the Wyner-Ziv decoder module 440 (FIG. 4), while the input image 820 is the scaled centre image 435 output from the downsampler module 430 of FIG. 4.

The disparity estimation module 800 estimates the disparity of the input image 810 from the input image 820 according to possibly a combination of matching criteria. Given that the cameras 122, 124, and 126 (FIG. 1) are separated horizontally, the output from the disparity estimation module 800 is an estimated disparity map 890, which describes the horizontal displacement for each pixel between the two images 810 and 820.

The two input images 810 and 820 are input into a pre-processing step 830. The pre-processing step 830 performs pre-processing operations, such as compensating optical distortion of the cameras at the two viewpoints and matching the colour intensities between the two images. Furthermore, the pre-processing step 830 also includes the step of rectifying the images according to their epipolar geometric correspondences. Due to the horizontal arrangement of the cameras 122, 124, and 126 in FIG. 1, the disparities between the two rectified images are restricted to the horizontal direction (the rectified epipolar line direction). The step 830 produces a rectified image set 835, including a rectified version of both the input image 810 and 820.

The rectified images 835 are processed in step 840. In the step 840, the disparity matching cost between the two rectified images (i.e., the rectified centre view corresponding to the input image 820 and the rectified side view corresponding to the input image 810) are calculated. The output of the step 840 is a four-dimensional (4-D) matching cost array 845, storing the pixel-level, disparity-matching cost for each disparity value between two rectified images 820, 810. The range of disparity values to be considered is defined according to the distance between two cameras (e.g., the distance between cameras 122 and 124 of FIG. 1).

The estimation of a disparity map between two images in step 840 is similar to finding the best motion vector fields in a conventional video coding scheme. In the exemplary implementation, the operation performed in the step 840 comprises the following three sub steps:

(1) Interpolating the two rectified images using an interpolation filter to generate pixel values for the half-pixel positions in both rectified images. Preferably, a cubic filter is used for the sub-pel interpolation. Alternatively, other interpolation filters such as bi-linear, bi-cubic, or Lancoz filter, may be used.

(2) At each pixel position, calculating the difference in pixel value between each pixel position in the rectified side view and its "corresponding pixel position" in the rectified centre view. The "corresponding pixel position" of the rectified centre view is the sum of the pixel position of the side view and a given disparity value. Preferably, the absolute difference (AD) is used to compute the matching costs. Alternatively, the square of difference (SD) or any other pixel similarity measures may be used.

(3) Repeat step (2) for each disparity value within a given search range determined by the distance between the two cameras. Preferably, the disparity values are arranged in an ascending order, starting from the minimum disparity value to the maximum disparity value in a step of half-pixel position. Alternatively, the disparity values may be in a descending order, or in any non-overlapped index order.

The disparity matching cost 845 calculated in the step 840 is input into step 850 for further processing. The step 850 performs the operations of aggregating the pixel-level disparity matching costs over a local neighbourhood, which is defined as a two-dimensional region at a fixed disparity. The output of the step 850 is a 4-D cost array 855, storing pixel-level aggregated disparity matching costs for each disparity value between two rectified views.

In the exemplary implementation, the step 850 uses a low-pass filter over the disparity map to avoid statistical outliers. In the exemplary embodiment, a box-filter is used. Alternatively, other low-pass filters, such as Gaussian filters, can also be used. Preferably, the box-filter runs through all the pixel coordinates of the cost array 845 in a raster-scan order, starting from the top-left corner of the pixel coordinates and ending at the bottom-right corner of the pixel coordinates. For each pixel coordinate, the aggregated matching costs for all possible disparity values are computed by the box filter before moving to the next pixel coordinate. For each disparity value, the pixel-level matching costs from a local neighbourhood (e.g., a 3×3 pixel windows) of the current pixel coordinate are extracted and averaged to produce a normalized value of the aggregated matching cost for the given pixel coordinates. These operations continue until all the pixel coordinates of the cost array 845 has been processed.

The aggregated matching costs 855 from the step 850 are subject to sub-pixel position interpolation in a further step 860. The step 860 is optional (as indicated by dashed lines) and is activated only when a sub-pixel disparity map is required. The step 860 performs the operations of generating aggregated matching costs for sub-pixel coordinates of the cost array 855. The output of the step 860 is a four-dimensional (4-D) matching cost array 865, containing sub-pixel level aggregated disparity matching costs for each disparity value between two rectified images.

In the exemplary implementation, the step 860 uses an interpolation filter to generate the sub-pel aggregated matching costs. Preferably, the interpolation filter is a bi-linear filter. Alternatively, other interpolation filters, such bi-cubic or Lancoz filter may be used. The interpolation is performed in a row-by-row basis. The aggregated matching cost at a sub-pel coordinate is interpolated based on the aggregated matching costs of the two adjacent integer pixel coordinates in the same row.

In an alternative implementation, the functionalities of the step 860 may be integrated into the steps 840 and 850. In this implementation, the rectified images 835 are interpolated to a sub-pel resolution (which matches the resolution of the high-resolution image 420 in FIG. 7) in step 840 before computing the pixel-level matching costs between the two images. Then, the pixel-level matching costs are accumulated in the step 850 according to the sub-pixel coordinates. The alternative implementation produces the same 4-D aggregated matching cost array 865, containing sub-pel level aggregated disparity matching costs for each disparity value between two rectified images.

In FIG. 8, the sub-level aggregated matching costs 865 is provided as input to a step 870, where matching cost minimization is performed and a disparity mapping between the two views is produced by conducting a minimization operation on the aggregated matching costs 865. The output of the step 870 is a disparity map 875 describing the disparities from the rectified centre image to the side view at high resolution (the resolution of the high-resolution image 420 in FIG. 7).

In the exemplary implementation, the step 870 uses a box-filter with a "shiftable window" to find the minimum aggregated matching costs for each sub-pel coordinates. The filter runs over all the pixel coordinates (sub-pel and full-pel) of the aggregated matching cost array 865. For each pixel coordinate, there is a local neighbourhood (e.g., a 5×5-pixel window) defined around the coordinate. The minimum aggregated matching cost in the local neighbourhood is assigned to be the aggregated matching cost for the given coordinate. The result is a disparity value which is associated with the minimum aggregated matching cost for a given pixel coordinate and is chosen to be the "optimal" disparity estimated for the given pixel coordinate.

In an alternative implementation, however, the cost minimization step 870 may take the pixel-level match costs 845 generated by the step 840 as its input instead. In this implementation, the operations in step 850 and 860 are skipped. Instead, the step 870 uses a global matching cost optimization method, such as max-flow, graph-cut, dynamic programming, and others known to those skilled in the art, to minimize the overall matching cost energy between the two rectified images. The output of this alternative implementation is the disparity map 875, which minimizes a global disparity matching energy for the rectified image pair.

The disparity map 875 generated so far typically contains a few artefacts due to errors and inaccuracy of the disparity estimation. Such artefacts include holes in the disparity map 875 due to occlusion between the two viewpoints, or spurious disparity values. These artefacts are eliminated in a post-processing step 880 in FIG. 8.

In the exemplary implementation, cross-checking (i.e., comparing one central-to-side disparity map 465 and another central-to-side disparity map 467 in FIG. 4) is used to detect occluded areas and holes. The detected occluded areas are filled by surface fitting. For those spurious disparity values, a median filter is applied to clean up the disparity outliers. The output of the step 880 is a final disparity map 890, which represents the optimal disparity between the two rectified images at high resolution (the resolution of the high-resolution image 420 in FIG. 4).

A number of methods, apparatuses, and computer program products for generating an enhanced digital image comprising a plurality of pixels have been disclosed with reference to embodiments of the invention. The embodiments of the invention are applicable to the computer- and data-processing industries, amongst others. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of generating an enhanced digital image comprising a plurality of pixels, said method comprising the steps of:
   using a first digital image captured by a first camera and parity bits generated from a second digital image captured by a second camera to construct a third digital image, the third digital image having a viewpoint matching the second camera, the second camera capturing the second digital image at a resolution lower than the resolution of the first camera capturing the first digital image;
   determining a disparity map dependent upon the first digital image and the third digital image; and
   enhancing the third digital image dependent upon the determined disparity map and the first digital image to generate the enhanced digital image, the enhanced digital image having a viewpoint corresponding to a viewpoint of the third digital image and having a resolution greater than the second digital image.

2. The method as claimed in claim 1, further comprising the step of storing one or more of the first digital image, the third digital image, and the enhanced digital image.

3. The method as claimed in claim 1, further comprising the steps of:
   obtaining the first digital image from the first camera; and
   obtaining the parity bits generated from the second digital image captured by the second camera.

4. The method as claimed in claim 1, wherein the first digital image is captured at a higher resolution than the second digital image.

5. The method as claimed in claim 1, wherein the first and second digital images are captured by the first and second cameras, respectively, having overlapping views of a scene.

6. The method as claimed in claim 1, further comprising the step of downsampling the first digital image to a resolution matching the resolution of the second digital image.

7. The method as claimed in claim 6, further comprising the step of Wyner-Ziv decoding the parity bits generated from the second digital image using the downsampled first digital image to provide the third digital image, the parity bits being output by a Wyner-Ziv encoder coupled to the second camera.

8. The method as claimed in claim 1, wherein the disparity map is determined using a downsampled version of the first digital image and the third digital image to provide a disparity map between the downsampled version of the first digital image and the third digital image.

9. The method as claimed in claim 1, further comprising the step of interpolating the disparity map to provide a higher-resolution version of the disparity map for use in said enhancing step.

10. The method as claimed in claim 9, wherein said enhancing step comprises disparity compensating the first digital image using the interpolated disparity map to generate the enhanced digital image, the enhanced digital image being a high resolution version of the second digital image.

11. The method as claimed in claim 10, wherein said disparity compensating comprises, for each pixel location in the third digital image:
   extracting a corresponding disparity value from the interpolated disparity map;
   locating a reference pixel in the first digital image; and
   replacing a pixel value of the pixel location in the third digital image with the pixel value of the located reference pixel.

12. The method as claimed in claim 1, further comprising the step of partitioning the first digital image into a plurality of image segments dependent upon the disparity map and the third digital image, each segment comprising an object having properties.

13. The method as claimed in claim 12, wherein the properties of the objects in the segments are used to enhance the first digital image in said enhancing step.

14. The method as claimed in claim 13, further comprising the step of identifying the objects based on properties of the objects from a database of pre-defined object primitives, the predefined object primitives being used in said enhancing step to enhance the first digital image.

15. The method as claimed in claim 1, further comprising the steps of:
   using the first digital image captured by the first camera and parity bits generated from a fourth digital image captured by a third camera to construct a fifth digital image, the fifth digital image having a viewpoint matching the third camera, the third camera capturing the fourth digital image at a resolution lower than the resolution of the first camera capturing the first digital image;
   determining a disparity map dependent upon the first digital image and the fifth digital image; and
   enhancing the fifth digital image dependent upon the determined disparity map and the first digital image to generate the enhanced digital image, the enhanced digital image having a viewpoint corresponding to a viewpoint of the fifth digital image and having a resolution greater than the fourth digital image.

16. An apparatus for generating an enhanced digital image comprising a plurality of pixels, said apparatus comprising:
- a memory for storing data and a computer program for a processor; and
- a processor coupled to said memory for executing the computer program stored in said memory to provide the enhanced digital image, the computer program comprising:
  - (a) computer program code means for using a first digital image captured by a first camera and parity bits generated from a second digital image captured by a second camera to construct a third digital image, the third digital image having a viewpoint matching the second camera, the second camera capturing the second digital image at a resolution lower than the resolution of the first camera capturing the first digital image;
  - (b) computer program code means for determining a disparity map dependent upon the first digital image and the third digital image; and
  - (c) computer program code means for enhancing the third image dependent upon the determined disparity map and the first digital image to generate the enhanced digital image, the enhanced digital image having a viewpoint corresponding to a viewpoint of the third digital image and having a resolution greater than the second digital image.

17. The apparatus as claimed in claim 16, further comprising:
- a first camera for capturing the first digital image;
- a second camera for capturing the second digital image;
- an encoder coupled to said second camera for generating the parity bits from the second digital image; and
- a communication interface coupled to said memory and said processor for providing the first digital image and the parity bits from the second digital image to said memory and said processor.

18. An image processing apparatus for generating an enhanced digital image comprising a plurality of pixels, said apparatus comprising:
- a constructing unit configured to construct, using a first image captured by a first camera and parity bits generated from a second camera, a third digital image, the third digital image having a viewpoint matching the second camera, the second camera capturing the second digital image at a resolution lower than the resolution of the first camera capturing the first digital image;
- a determining unit configured to determine a disparity map dependent upon the first digital image and the third digital image; and
- an enhancing unit configured to enhance the third digital image dependent upon the determined disparity map and the first digital image to generate the enhanced digital image, the enhanced digital image having a viewpoint corresponding to a viewpoint of the third digital image and having a resolution greater than the second digital image.

19. The apparatus according to claim 18, further comprising an obtaining unit configured to obtain the first digital image from the first camera and to obtain parity bits generated from the second digital image captured by the second camera.

20. A computer program product comprising a non-transitory computer-readable storage medium having recorded thereon a computer program for generating an enhanced digital image comprising a plurality of pixels, the computer program comprising:
- computer program code means for using a first digital image captured by a first camera and parity bits generated from a second digital image captured by a second camera to construct a third digital image, the third digital image having a viewpoint matching the second camera, the second camera capturing the second digital image at a resolution lower than the resolution of said the camera capturing the first digital image;
- computer program code means for determining a disparity map dependent upon the first digital image and the third digital image; and
- computer program code means for enhancing the third image dependent upon the determined disparity map and the first digital image to generate the enhanced digital image, the enhanced digital image having a viewpoint corresponding to a viewpoint of the third digital image and having a resolution greater than the second digital image.

* * * * *